(12) United States Patent
Clark et al.

(10) Patent No.: US 12,104,712 B1
(45) Date of Patent: Oct. 1, 2024

(54) LEVER OPERATED DUMP VALVE WITH IMPROVED ACCURACY

(71) Applicant: Gator, L.L.C., Guthrie, OK (US)

(72) Inventors: Jason L. Clark, Guthrie, OK (US); Stephen P. Ambrose, Guthrie, OK (US)

(73) Assignee: GATOR, L.L.C., Guthrie, OK (US)

( * ) Notice: Subject to any disclaimer, the term of this patent is extended or adjusted under 35 U.S.C. 154(b) by 0 days.

(21) Appl. No.: 17/525,679

(22) Filed: Nov. 12, 2021

Related U.S. Application Data

(63) Continuation of application No. 16/747,740, filed on Jan. 21, 2020, now abandoned, which is a continuation of application No. 16/716,203, filed on Dec. 16, 2019, now abandoned.

(60) Provisional application No. 62/781,219, filed on Dec. 18, 2018.

(51) Int. Cl.
*F16K 31/26* (2006.01)
*F16K 31/14* (2006.01)
*F16K 31/53* (2006.01)

(52) U.S. Cl.
CPC ............ *F16K 31/265* (2013.01); *F16K 31/14* (2013.01); *F16K 31/53* (2013.01); *Y10T 137/7439* (2015.04)

(58) Field of Classification Search
CPC ........ F16K 31/34; F16K 31/265; F16K 31/14; F16K 31/53; E21B 43/34; G05D 7/0166; Y10T 137/7358–7494
USPC ........ 137/412, 413, 315.08, 434–451; 91/19, 91/357, 461, 376 R; 251/28
See application file for complete search history.

(56) References Cited

U.S. PATENT DOCUMENTS

| | | | | |
|---|---|---|---|---|
| 1,863,590 A | * | 6/1932 | Carlson | F16K 31/30 137/391 |
| 2,152,651 A | * | 4/1939 | Kinzie | F16K 31/16 464/24 |
| 2,965,200 A | * | 12/1960 | Pribonic | B60G 17/033 267/155 |
| 3,260,502 A | * | 7/1966 | Plumer | F16K 1/2285 251/308 |

(Continued)

OTHER PUBLICATIONS

The WellMark Company, L.L.C., "WellMark, Series 1250 Section No. 13.2 brochure", {retrieved online Apr. 8, 2023 from https://dresserutility.com/wp-content/uploads/1250-Lever-Operated-Valve.pdf} (Year: 2003).*

*Primary Examiner* — Craig J Price
(74) *Attorney, Agent, or Firm* — Dunlap Codding, P.C.

(57) ABSTRACT

An improved mechanical dump valve for a liquid level control system. The dump valve comprises a splined shaft that communicates with the valve actuator by a toothed member, such as a splined bore in a dump valve hub. The dump valve also may include pressure ports. Still further, the present invention includes a liquid level control system comprising a trunnion assembly and a mechanical dump valve in which the trim motion of the float valve is transmitted by means of splined shafts in both the trunnion assembly and the dump valve assembly. The inventive system may comprise float weights for weighting the float accurately without having to drill the float and load it with sand or other weighting material. Also included is a kit for retrofitting existing liquid level control systems that use D-shaped connections with splined components.

17 Claims, 16 Drawing Sheets

(56) References Cited

U.S. PATENT DOCUMENTS

| | | | | |
|---|---|---|---|---|
| 4,176,823 | A | * 12/1979 | Gliatas | F16K 1/2268 251/308 |
| 5,988,205 | A | * 11/1999 | Eggleston | F16K 31/1655 137/315.35 |
| 2014/0041468 | A1 | * 2/2014 | Yukitake | H02K 7/116 74/89 |

* cited by examiner

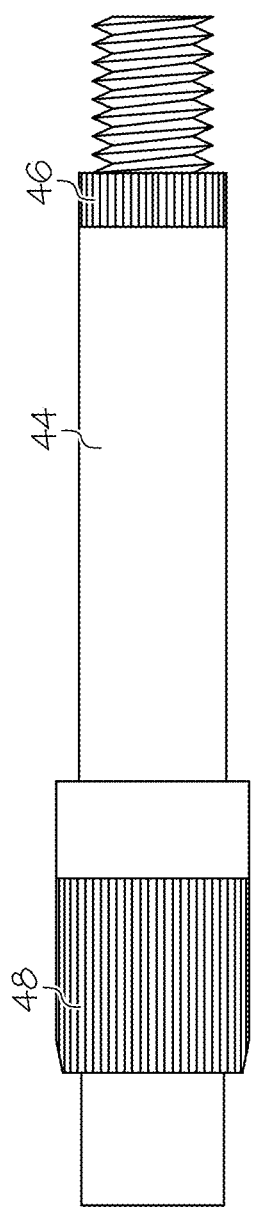
FIG. 5
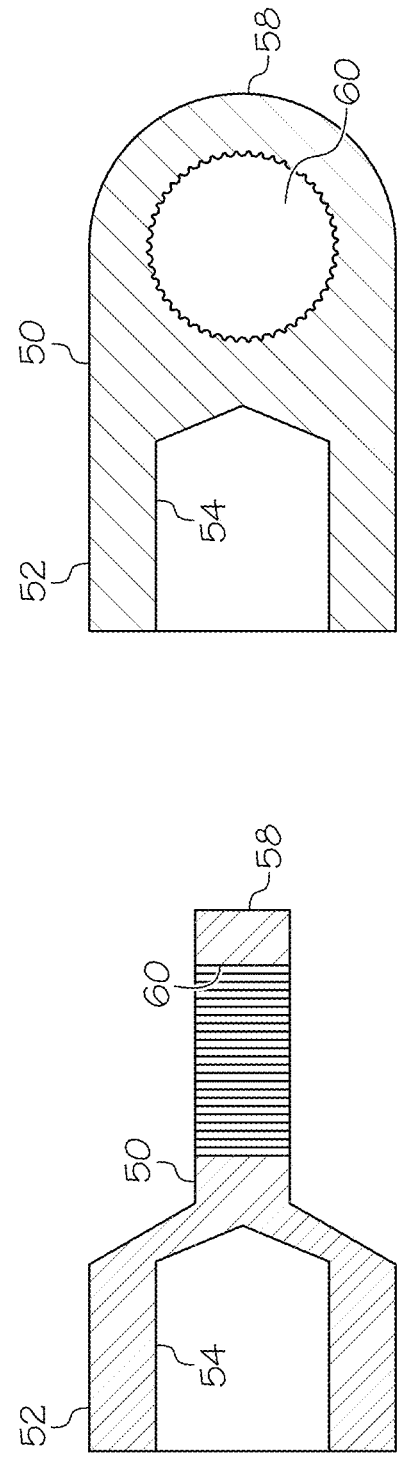
FIG. 7
FIG. 6

LEVER OPERATED DUMP VALVE WITH IMPROVED ACCURACY

CROSS-REFERENCE TO RELATED APPLICATIONS

This application is a continuation of co-pending U.S. patent application Ser. No. 16/747,740 filed Jan. 21, 2020, entitled "Lever Operated Dump Valve with Improved Accuracy," which is a continuation of co-pending U.S. patent application Ser. No. 16/716,203 filed Dec. 16, 2019, entitled "Lever Operated Dump Valve with Improved Accuracy," which claims the benefit of U.S. provisional application No. 62/781,219 entitled "Lever Operated Dump Valve with Improved Accuracy," filed Dec. 18, 2018, the contents of which are incorporated herein by reference.

FIELD OF THE INVENTION

The present invention relates generally to valves for controlling the release of fluid from a vessel and, more particularly but without limitation, to lever-operated float valves.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 5 is a side elevational view of the shaft of the trunnion assembly.

FIG. 6 is a horizontal sectional view of the float arm hub of the trunnion assembly.

FIG. 7 is a vertical sectional view of the float arm hub of the trunnion assembly.

DETAILED DESCRIPTION OF THE PREFERRED EMBODIMENT(S)

Figure 1:
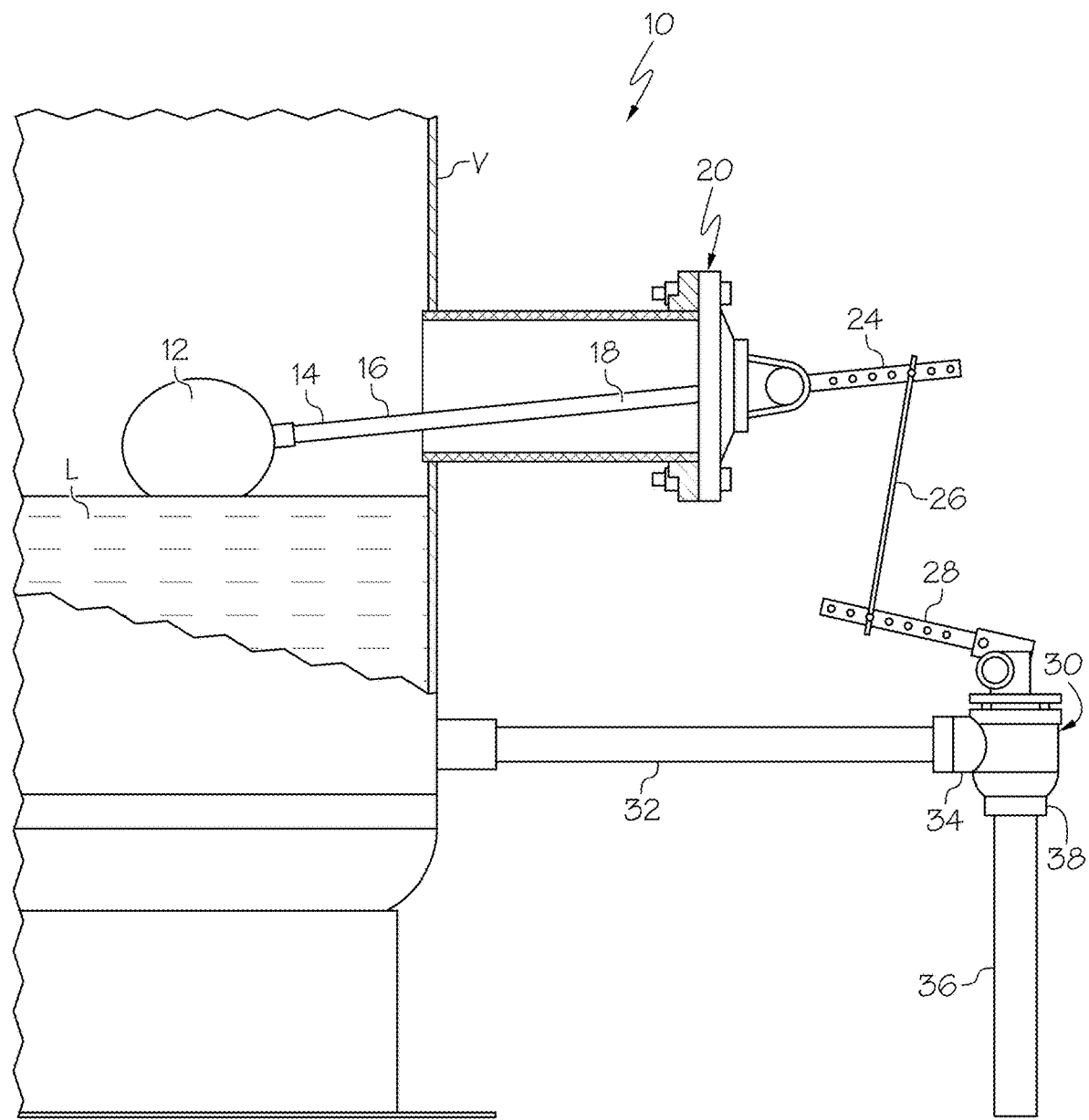
FIG. 1 is a schematic illustration of a liquid level control system on a separation vessel.
Figure 2:
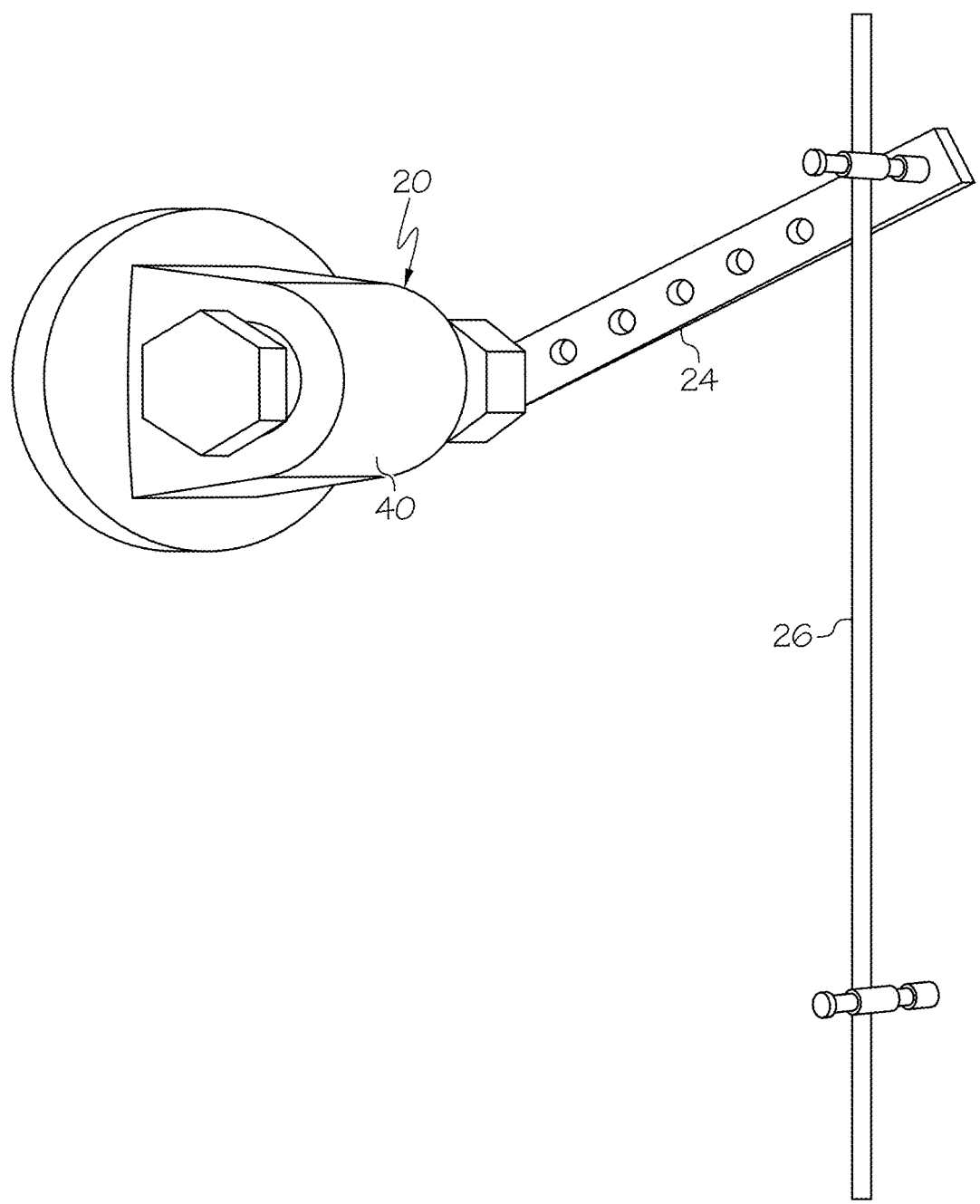
FIG. 2 is a perspective view of the trunnion assembly.
Figure 3:
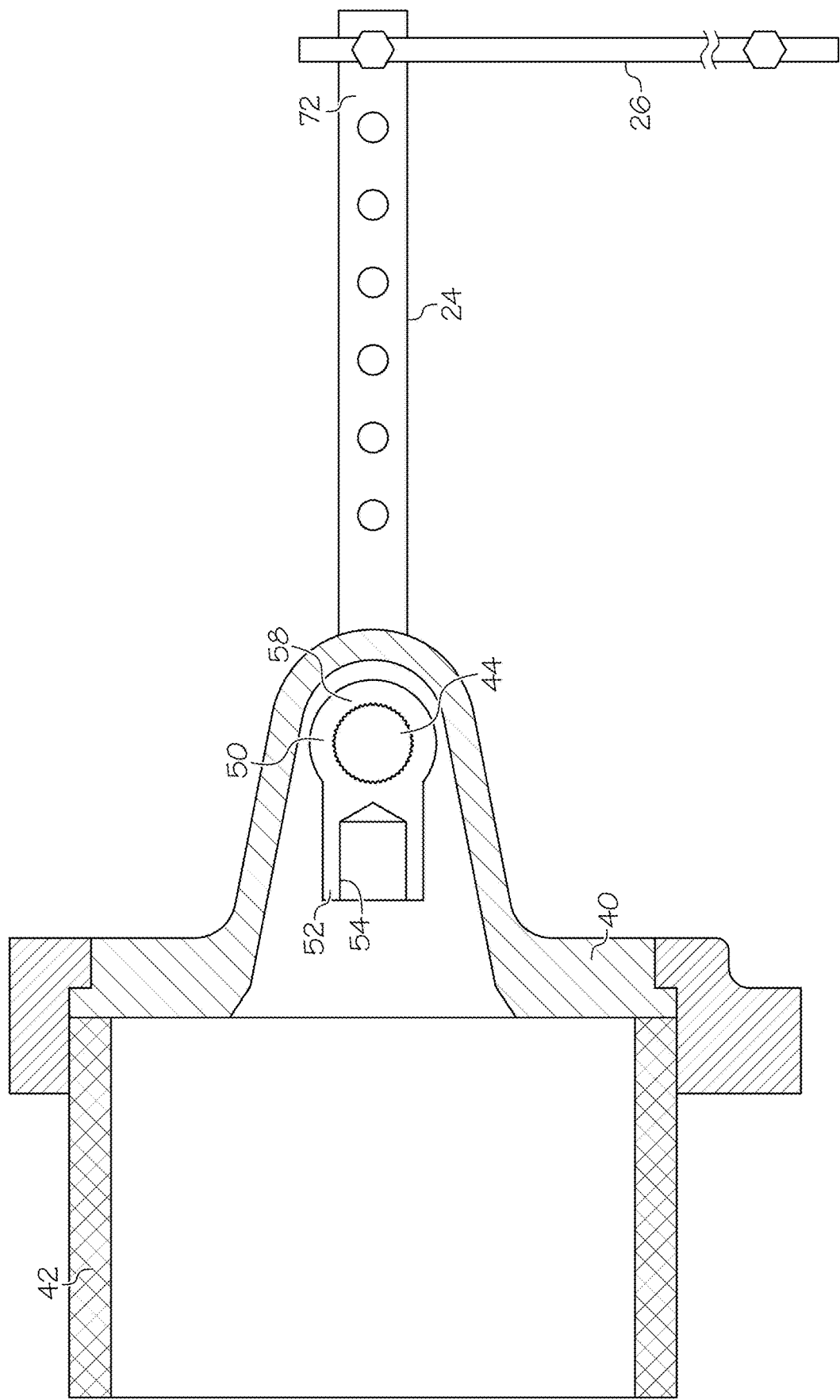
FIG. 3 is a vertical sectional view of the trunnion assembly.

There are many applications where a mechanical dump valve is an efficient and economic means for controlling the level of fluid in a vessel. For example, in the oil field, a liquid level control is necessary for controlling the level of fluid in oil and gas production vessels, such as separation tanks, heater treaters, and free-water knockout vessels. A float attached to the end of a pivotally mounted float arm detects the level of the liquid in the vessel. The float arm is supported by a trunnion assembly mounted to the side of the vessel. The trim motion of the float is transmitted to a trunnion lever. The trunnion lever is connected by a linkage rod to the lever of a mechanical dump valve. The dump valve lever controls the operation of the dump valve.

The rotational connections in most conventional trunnion assemblies and dump valves utilize either a shaft that is D-shaped in cross-section inside a hub or knuckle with a D-shaped bore, a set screw, or cotter pin type engagement, or a keyed configuration. While these connections do transmit torque, accuracy and durability may be a problem. For example, due to rotational slack in the movement of the D-shaft inside the hub, the torque transmission may be inaccurate.

The present invention provides a lever-controlled liquid level control system with improved accuracy and durability by using splined connections to transmit torque. In accordance with the present invention, the D-shaped shafts in both the trunnion assembly and the dump valve assembly are replaced with splined shafts that act as gears or cogwheels. The splined shaft engages a toothed member to so that motion is transmitted to or received by the shaft. For example, the toothed member may be a hub or knuckle with internal splines that mate with the splines on the shaft to form a spline joint. In the trunnion assembly, trim motion of the float arm is converted to rotation of the trunnion shaft. In the dump valve, rotation of the dump valve shaft is transmitted to linear motion of valve member in the dump valve. The splined connections substantially improve the accuracy and durability of the system.

In many applications, the liquid level control system is used to remove water from a vessel containing oil and water. In these applications, the float is weighted to detect the water level, that is, the oil-water interface in the vessel. According to conventional practice, the float is disconnected from the float arm coupling, and a hole is drilled in the float. Then, using a funnel, sand or some other weighted material, such as BB's or shot, is poured into the float. After adding some of the sand, the float arm is reattached and the float is tested in a large container of water to see how far it sinks into the water. The amount of weighted material is adjusted to achieve the desired degree of submersion. For example, the weights may be selected to achieve about eighty percent (80%) submersion of the float ball.

While this procedure is effective, it requires the use of a drill and the removal and reattachment of the float arm, sometimes more than once. Additionally, unless care is taken to form a water-tight seal when the float arm is reattached, water may seep inside the float when it is returned to the pressurized tank, which in turn negatively affects the accuracy of the system.

In accordance with the present invention, a float weight assembly is provided. The weight assembly comprises several weight members, such as ring-shaped weights, that simply slide onto the float arm adjacent the float. The assembly may include several weight members with different weights. The weight members are selected to achieve the desired float level, and then the stop is secured on the float arm to hold the weight members in position. This eliminates the need to drill the float and to remove and replace the float arm. The inventive float weight assembly is easier and faster to use and eliminates the possibility of fluid entering the float under pressure.

In most conventional mechanical liquid level control systems, additional valved piping is included upstream and downstream of the dump valve as the system may be operating under pressure. This allows operators to manually bleed off or depressurize the system as needed for servicing and repair. However, the extra piping significantly increases the footprint of the system as well as the complexity and cost. In accordance with one embodiment of the present invention, the dump valve is provided with one or more manual bleed off ports. Ideally, a bleed off port is provided on the inlet side and the outlet side of the valve body. This eliminates the need for additional piping upstream and downstream of the dump valve.

Turning now to the drawings in general and to FIG. 1 in particular, a liquid level control system made in accordance with one embodiment of the present invention will be explained. The liquid level control system, designated generally by the reference number 10, is employed to control the level of a liquid L in the vessel V. This system 10 comprises a float 12 supported on the first end 14 of a float arm 16 inside a vessel V so that the float rises and falls with the fluid level.

The second end 18 of the float arm 16 is pivotally supported in a trunnion assembly 20 mounted on the vessel V. The trim motion of the float arm 16 is transmitted to a lever 24 that is connected by a linkage rod 26 to the lever 28 of a mechanical dump valve assembly 30. Thus, as the fluid level rises and falls, the dump valve 30 opens and closes. An input line 32 connects the vessel V to the inlet 34 of the dump valve assembly 30, and an output line 36 carrying the liquid from the outlet 38 of the dump valve to the target location, such as a sales line or disposal pipe.

Turning now to FIGS. 2-8, one embodiment of the inventive trunnion assembly 20 will be explained. The trunnion assembly 20 comprises a housing or bonnet 40 that is attachable to the side of the vessel V. In the illustrative embodiment shown, the bonnet 40 is attached to the vessel V using a weld neck 42 or a "hammer union" type fixture. Alternately, the bonnet 40 can be attached using a flange or bolt-on type fixture or other suitable structure.

A trunnion shaft 44 is rotationally mounted in the bonnet 40. The shaft 44 has a first splined section 46 and a second splined section 48, best shown in FIGS. 4 and 5. As shown, the splined sections 46 and 48 are discontinuous, that is, spaced a distance apart. However, in some embodiments, these splined sections may be adjacent or continuous. Additionally, in the present embodiment, the second splined section has a larger diameter than the first splined section. The first and second splined sections may have the same diameter or the second splined section may have the smaller diameter.

The trunnion assembly further comprises a float arm hub 50 with a first end 52 that is non-movably attachable to the second end 18 of the float arm 16. By way of example, the first end 52 may include a recess or socket 54 for receiving the second end 18 of the float arm 16.

The second end 58 of the float arm hub 50 may comprise a toothed member, such as a splined bore 60 (FIGS. 6 and 7) configured to receive the second splined section 48 of the trunnion shaft 44 so the float arm hub 50 is non-rotative relative to the trunnion shaft 44. While the exemplary trunnion assembly 20 utilizes a float arm hub 50, another toothed structure may be employed. As used herein, "toothed member" means a structure having grooves and ribs configured to operatively engage the second splined section 48 on the trunnion shaft 44 with the second end 18 of the float arm 16 so that the float arm 16 is non-rotative relative to the trunnion shaft 44 and the trim motion of the float arm is transmitted to the trunnion shaft.

Figure 4:
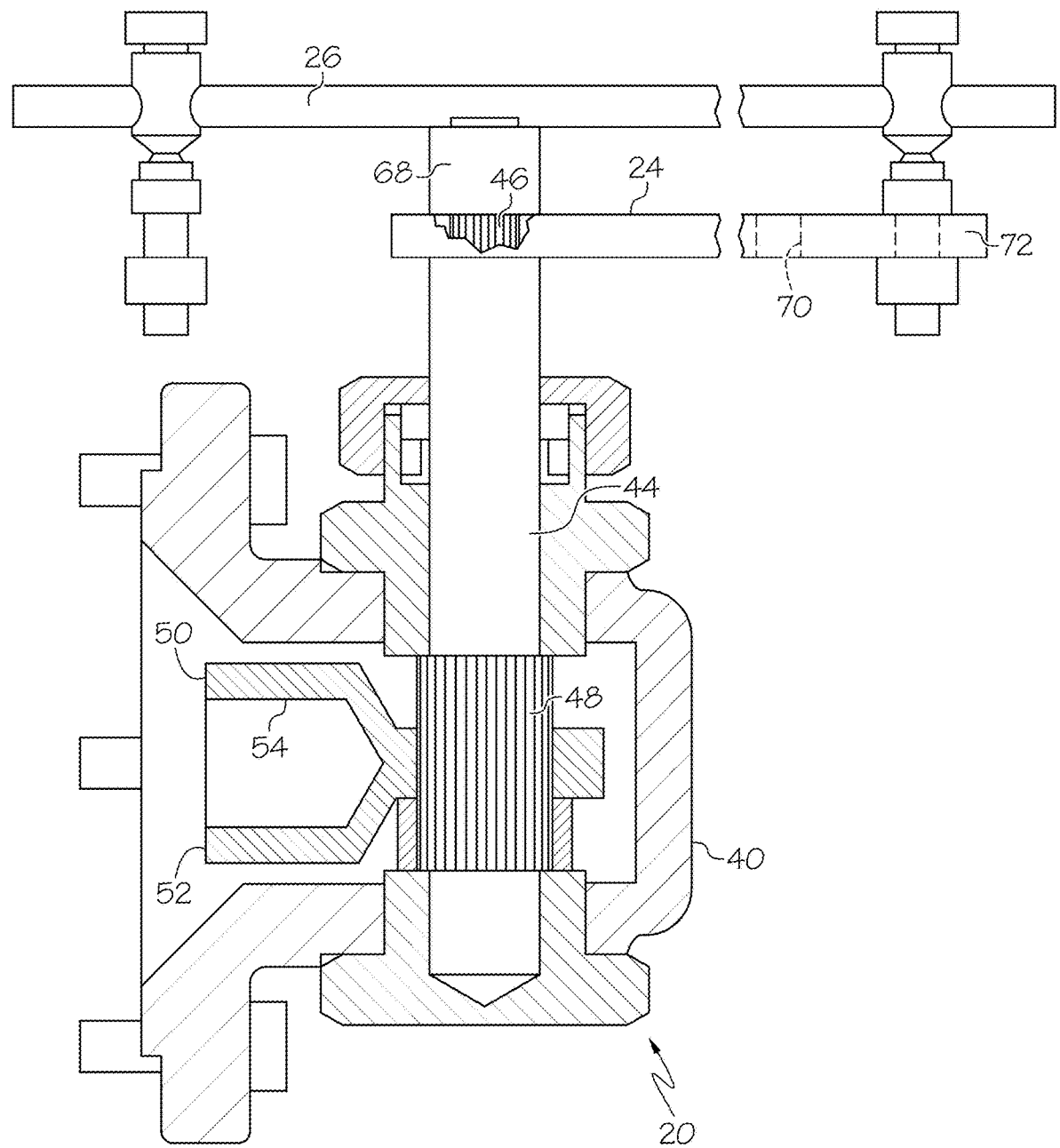
FIG. 4 is a horizontal sectional view of the trunnion assembly.
Figure 8:
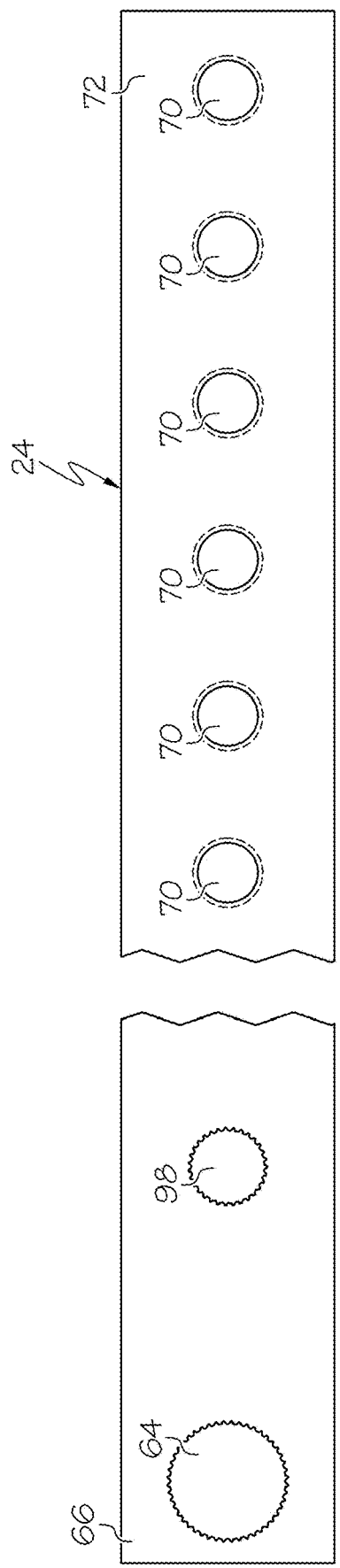
FIG. 8 is a fragmented side view of the lever of the trunnion assembly.
Figure 9:
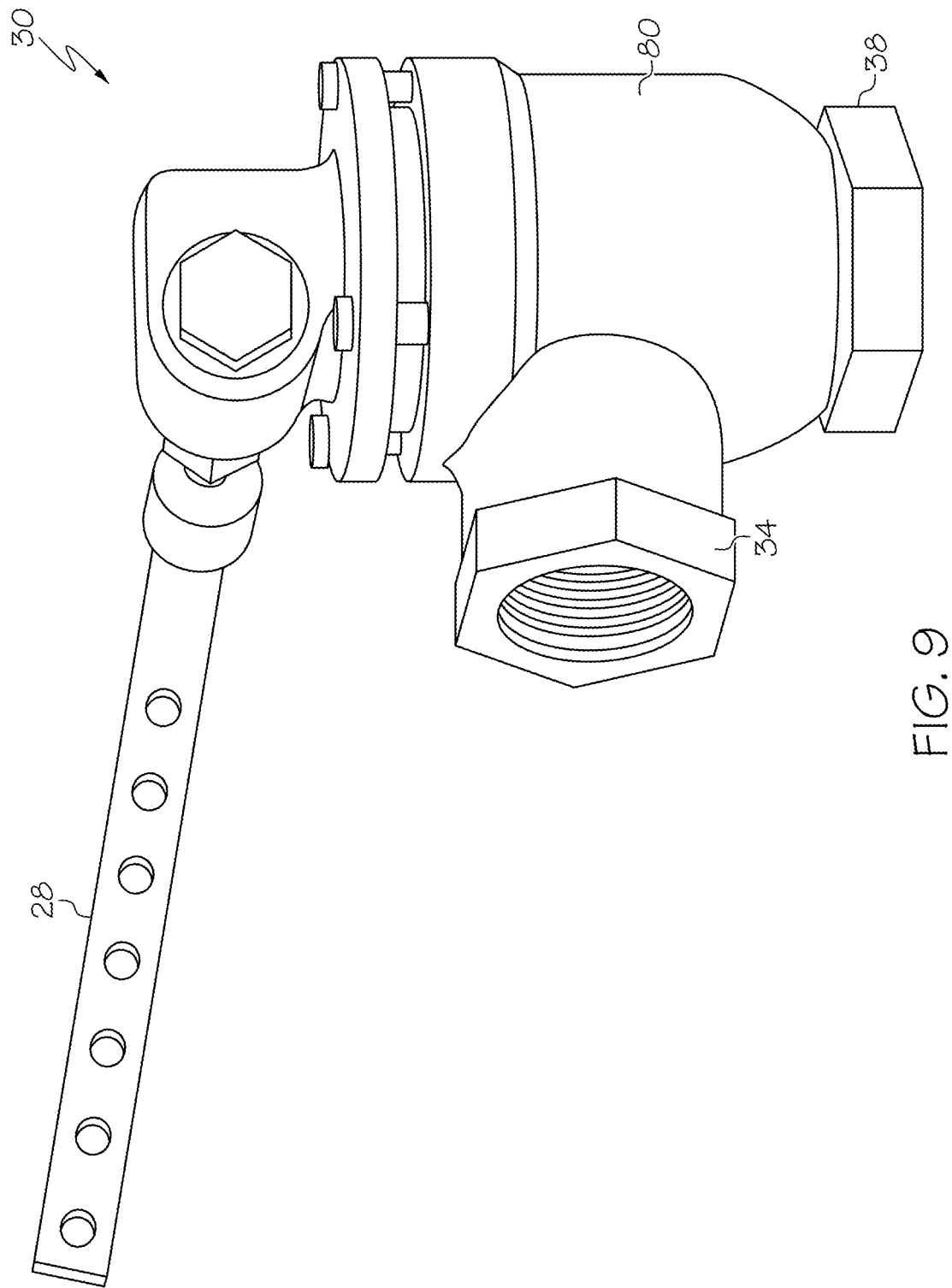
FIG. 9 is a perspective view of the dump valve.
Figure 10:
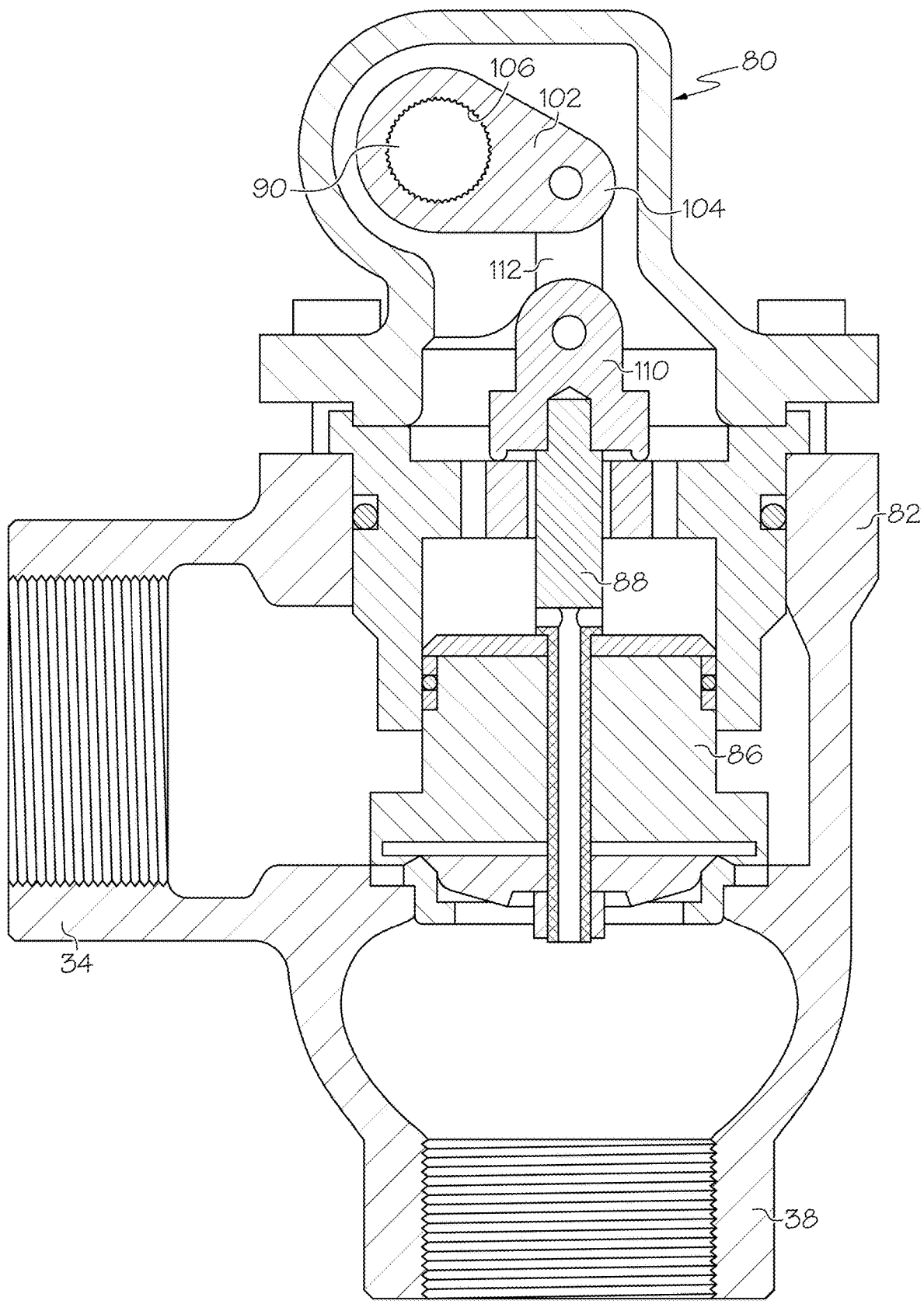
FIG. 10 is a vertical sectional view of the dump valve.

With continuing reference to FIGS. 2-8, the trunnion lever 24 is an elongate rigid member, as seen best in FIG. 8. The dimensions of the lever 24 may vary. The lever 24 may have a splined bore 64 near a first end 66. The splined bore 64 is configured to operatively receive and engage the first splined section 46 on the trunnion shaft 44 so the trunnion shaft 44 is non-rotative relative to the trunnion lever 24 whereby rotational motion of the shaft is transmitted to the lever 24. The axial position of the shaft 44 in the splined bore 64 is secured by a nut 68 (FIG. 4). The lever 24 may have multiple spaced apart holes 70 spaced across the length of the lever between the first end 66 and the second end 72 for connecting to the linkage rod 26 (FIG. 1).

In most conventional trunnion assemblies, a trunnion hub or knuckle is used to connect the end of the trunnion shaft to the lever hub. The typical lever hub has a top section that is connectable to the lever using two spaced apart bolts. The bottom of the lever hub has a D-shaped bore to matingly receive the D-shaped end of the trunnion shaft. One advantage of the present invention is that the lever hub may be omitted, simplifying the overall system. That is, the lever 24 is provided with the splined bore 64, as described above, and the splined end of the shaft 44 is receivable directly in the lever bore. However, the present invention also contemplates the use of a lever hub with a splined bore instead of the D-shaped bore to attach the end of the shaft to the lever indirectly. As used herein, "operatively connect" or "operatively connectable" refers to a connection, whether direct or indirect, that achieves the torque or motion transmitting function.

Now it will be understood that the pivotal or trim motion of the float arm 14 is transmitted by the float hub 50 or other toothed member to rotational motion of the trunnion shaft 44. In turn, rotation of the trunnion shaft 44 is transmitted to vertical motion of the trunnion lever 24. Thus, the splined trunnion shaft 44 acts as gear to receive motion from the float arm when it engages the toothed the splined bore in the float hub 50 and to transmit motion to the lever 24 when the splined section engages the splined bore in the trunnion lever 24. In this way, changes in the level of the liquid in the vessel V are accurately conveyed to the dump valve.

Turning now to FIGS. 9-13, an embodiment of the inventive dump valve assembly 30 will be explained in more detail. The dump valve assembly 30 comprises a dump valve 80 comprising a dump valve housing or body 82 that defines the inlet 34 and the outlet 38. Passage of liquid through the valve body 82 is controlled by a valve member such as a piston 86. As used herein, "valve member" refers to the structure that opens and closes the passage for liquid passing through the valve body, that is, from the inlet 34 to the outlet 38. While the embodiment of FIGS. 9-13 employs a reciprocating piston for this purpose, the invention is not so limited.

With continued reference to FIGS. 9-13, the valve 80 further comprises a valve actuator 88 to operate the valve member. In this embodiment where the valve member is a vertically reciprocating piston, the valve actuator 88 may be a valve stem. Again, the structure of the valve actuator may vary depending on the type of valve member utilized.

Figure 11:
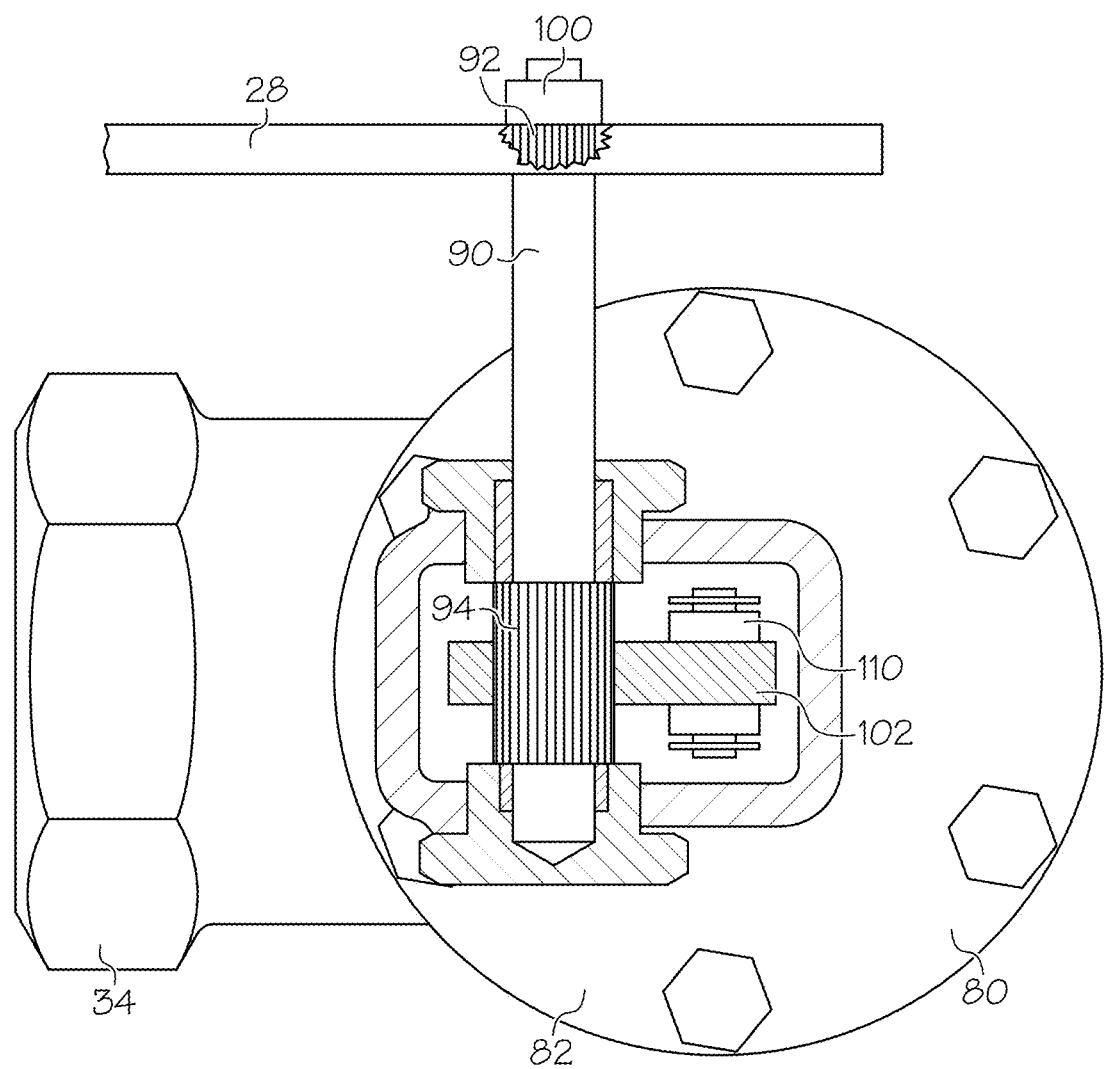
FIG. 11 is a horizontal sectional view of the dump valve.
Figure 12:
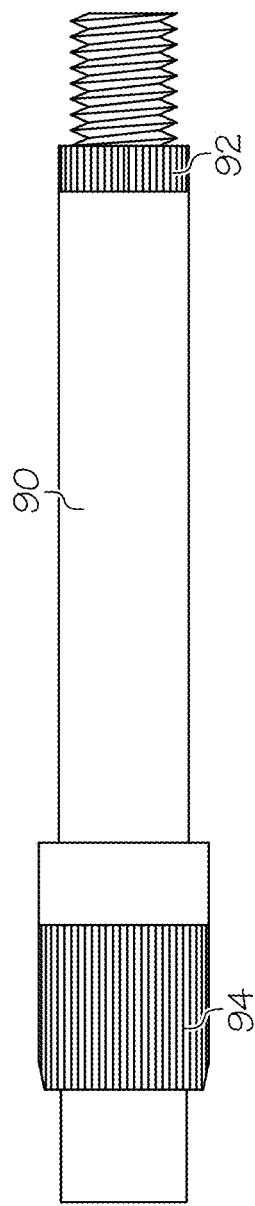
FIG. 12 a side elevational view of the shaft of the dump valve.
Figure 13:
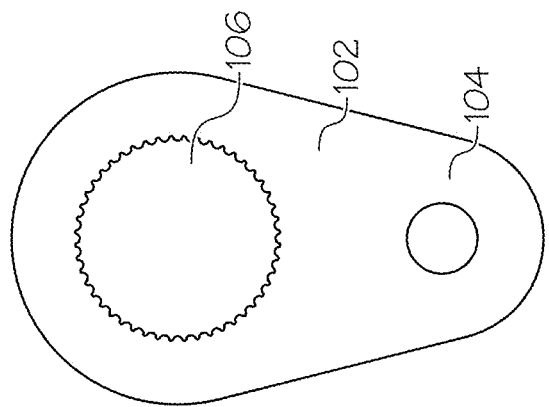
FIG. 13 is an end view of the dump valve hub.

The valve 80 further comprises a dump valve shaft 90, best seen in FIGS. 11 and 12. The shaft 90 has a first splined section 92 and a second splined section 94. In the exemplary embodiment, the first and second splined sections 92 and 94 are spaced a distance apart on the shaft 90. However, as in the case of the trunnion shaft, in some embodiments, the two splined sections may be continuous. Additionally, in the present embodiment, the second splined section has a larger diameter than the first splined section. The first and second splined sections may have the same diameter or the second splined section may have the smaller diameter.

As mentioned above, the dump valve assembly 30 includes a dump valve lever 28. To simplify construction and marketing, the dump valve lever 28 may be identical to the trunnion lever 24 shown in FIG. 8, and for this reason is not shown separately herein. Conveniently, the first end 66 of the lever 24 will include a second splined bore 98, and this second splined bore will be sized to receive and operatively engage with the first splined section 92 of the dump valve shaft 90 so the dump valve lever 28 is non-rotative relative to the dump valve shaft 90. The shaft 90 is secured to the lever 28 using a nut 100.

In most conventional dump valve assemblies, a lever hub or knuckle is used to connect the end of the dump valve shaft to the dump valve lever. The typical lever hub has a top section that is connectable to the lever using two spaced apart bolts. The bottom of the lever hub has a D-shaped bore to matingly receive the D-shaped end of the dump valve shaft and is secured with a nut. As explained previously, one advantage of the present invention is that this lever hub may be omitted, simplifying the overall system. That is, the lever 24 is provided with the second splined bore 98, as described above, and the splined end of the shaft 90 is receivable directly in the lever bore. However, the present invention also contemplates the use of a lever hub with a splined bore instead of the D-shaped bore to attach the end of the shaft to the lever indirectly.

As explained previously, the trim motion of the float arm 16 is translated into vertical motion of the trunnion lever 24, and the trunnion lever is linked to the dump valve lever 28 by the linkage rod 26. To transmit the motion of the dump valve lever 28 to the valve actuator 88, a toothed member is included in the valve 80. For example, the valve 80 may include a knuckle or hub 102 (see FIG. 13) with a first end 104 linked to the valve actuator 88 and an internally splined bore 106 to receive the second splined section 94 of the dump valve shaft 90 forming a spline joint. In this way, motion of the dump valve lever 28 is transmitted to the valve actuator 88.

It is noted that the other components, namely, a nut 110 and a link 112 are interposed between the actuator 88 and the first end 104 of the hub 102. It will be appreciated that type, size, and configuration of the valve mechanism and its components may vary; the specific structure depicted in these drawings is exemplary only.

While the illustrative dump valve assembly 30 utilizes a hub 102, another toothed member may be employed. As used here, "toothed member" means broadly any structure having grooves and ribs configured to operatively engage the second splined section 94 on the dump valve shaft 90 with the valve actuator 88 so that the dump valve shaft 90 is non-rotative relative to the hub 102 and rotational motion of the shaft 90 in response to vertical movement of the lever 28 is transmitted to the valve actuator 88 to operate the valve member 86.

Figure 14:
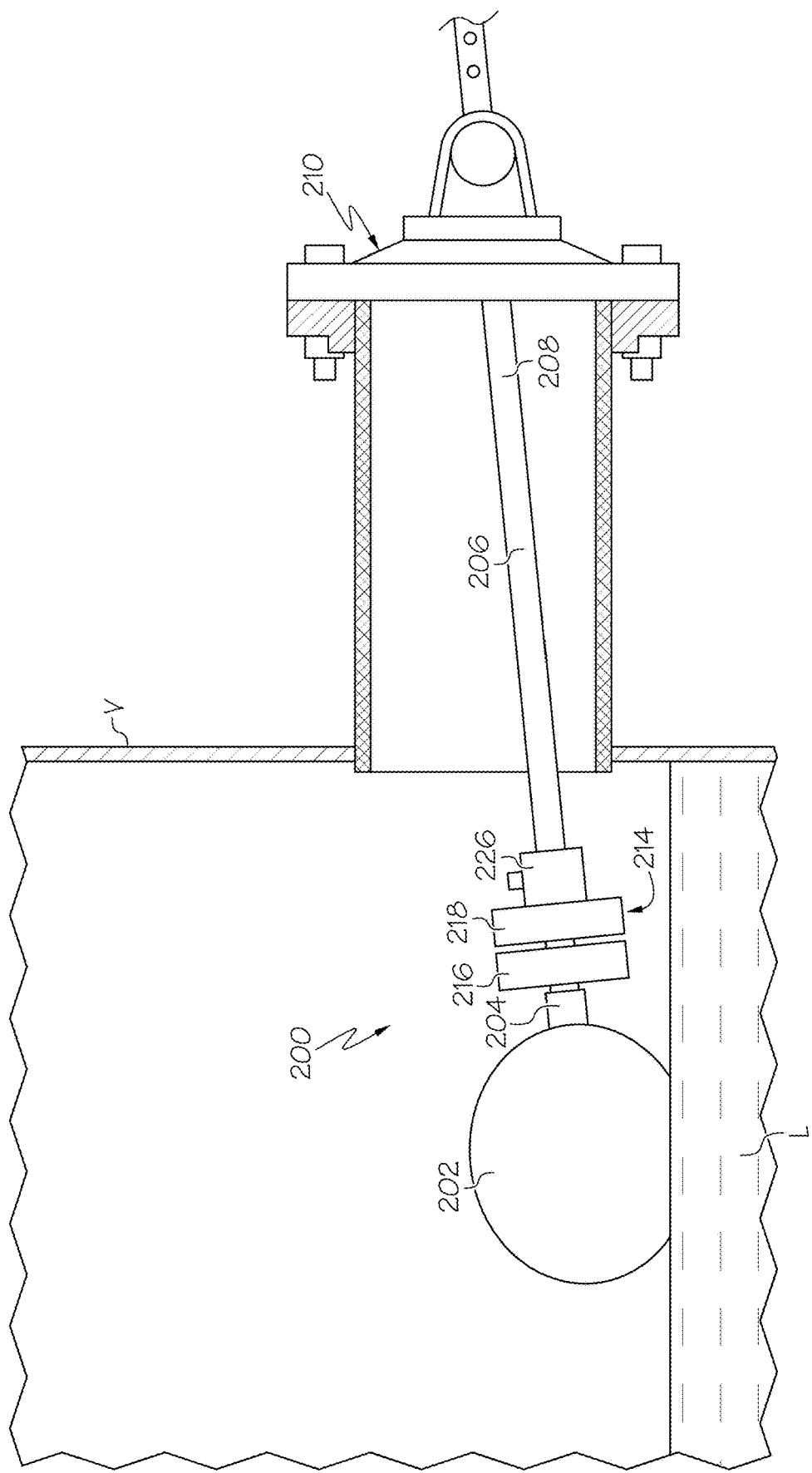
FIG. 14 is a schematic illustration of the float assembly of a liquid level control system on a separation vessel showing the use of float weights made in accordance with an embodiment of the present invention.

Turning now to FIGS. 14-18, an embodiment of the inventive float weight assembly will be explained. As shown in FIG. 14, a float assembly 200 comprises a typical float 202 attached to the coupling 204 on the first end of a float arm 206. The second end 208 of the float arm 206 is pivotally supported by a trunnion assembly 210. The float assembly 200 is shown in a vessel V containing liquid L. Although not shown in FIG. 14, the float assembly 200 and trunnion assembly 210 may be part of a larger liquid level control system (not shown) for controlling the level of liquid L in the vessel V. The trunnion assembly 210 may be a conventional trunnion assembly or it may be a trunnion assembly comprising splined connections as previously described; the inventive float weights are equally advantageous to both.

Referring still to FIG. 14, the inventive float assembly 200 comprises a weight assembly 214. The weight assembly 214 comprises a plurality of weight members removably receivable on the float arm 206. In the embodiment shown, the plurality of weight members comprises a first weight 216 and a second weight 218. Often, it will be desirable to include more than two members.

Figure 15:
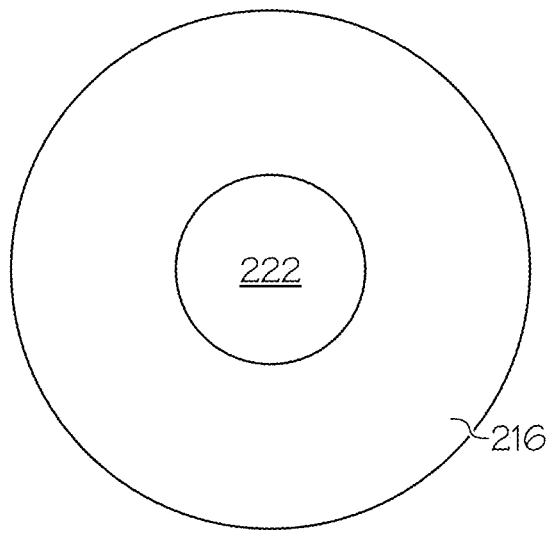
FIG. 15 is an end elevational view of one of the inventive float weights shown in FIG. 14.
Figure 16:
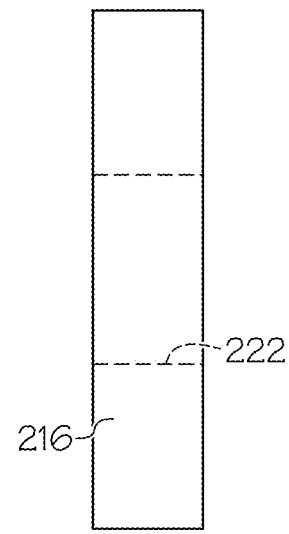
FIG. 16 is a side elevational view of one of the inventive float weights shown in FIG. 14.

An exemplary weight member 216 is shown in FIGS. 15 and 16. As indicated, the float weight 216 is removably receivable on the float arm 206. This may be accomplished in various ways. In most applications, a simple annular or ring-shaped weight will be ideal. The shape and dimensions of the weight members may vary. The weights may be formed of any suitable material, such as stainless steel or another material that that is sufficiently heavy. In some embodiments, the weights may be made of one material and then plated or coated.

The central opening 222 is sized to slide onto the float arm 206. The shape of the central opening 222 may be the same as the cross-sectional shape of the float arm 206—circular or polygonal—or it may be different. They may be rigid or flexible. Now it will be apparent that the simple ring-shaped weights 216 and 218 are easily placed on the float arm 206 while it is still attached to the float 202; there is no need to remove the float arm or to drill a hole in the float 202. Alternately, float weights that open and closed around the float arm could be used.

In one embodiment, there are at least two weight members 216 and 218 with different weights. For example, one member 216 may weigh 2.13 kg (4.70 pounds) while the second member 218 weighs 1.07 kg (2.35 pounds). In some embodiments, additional weight members weighing 0.68 kg (1.50 pounds) may be included. Any number and combination of sizes and weights may be included.

In most instances it will be desirable to include a stop member 226 configured to secure one or more of the plurality of weight members 216 and 218 in a selected position on the float arm 206. By way of example, the stop member 226 may be configured to secure the weight members 216 and 218 together adjacent the float arm coupling 204. Thus, the stop member 226 will keep the weight members 216 and 218 from moving along the float arm 206 as it rises and falls inside the vessel V.

Figure 17:
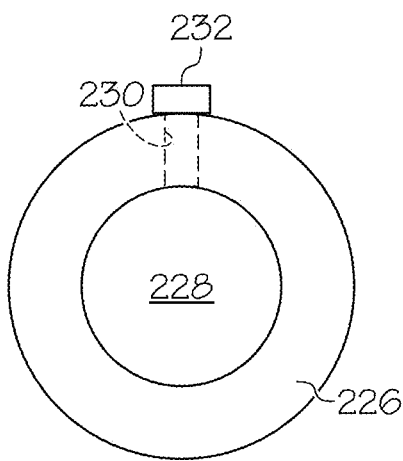
FIG. 17 is an end elevational view of the inventive stop shown in FIG. 14.
Figure 18:
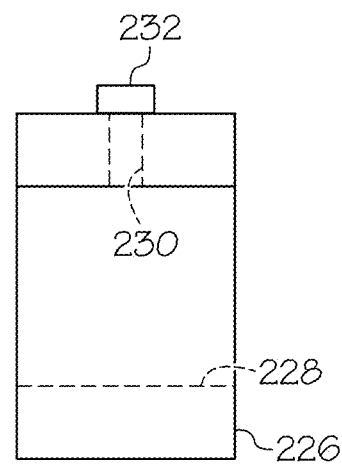
FIG. 18 is a side elevational view of the inventive stop shown in FIG. 14.

As best shown in FIGS. 17 and 18, the stop member 226 may be a simple annular or ring-shaped collar with a central opening 228 sized to be slidably received on the float arm 206. The shape of the central opening 228 may be the same as the cross-sectional shape of the float arm 206—circular or polygonal—or it may be different. The stop collar 226 may be rigid or flexible. Now it will be apparent that the stop member 226 is easily placed on the float arm 206 behind the weight members 216 and 218 without having to first remove the float arm or to drill a hole in the float 202. Alternately, a stop collar 226 that opens and closes around the float arm 206 or to hang in some manner from the float arm could be used.

The stop member 226 may include a radially extending threaded bore 230 and a set screw 232 threadedly receivable therein. The set screw 232 can be adjusted to frictionally engage the float arm 206 so that the stop member 226 captures the weight members 216 and 218 between the stop and the coupling 204 on the float arm 206. The stop member 226 may be formed of any suitable material. In some embodiments, the stop member may be made of any suitable material and may or may not be plated or coated with another material.

Figure 19:
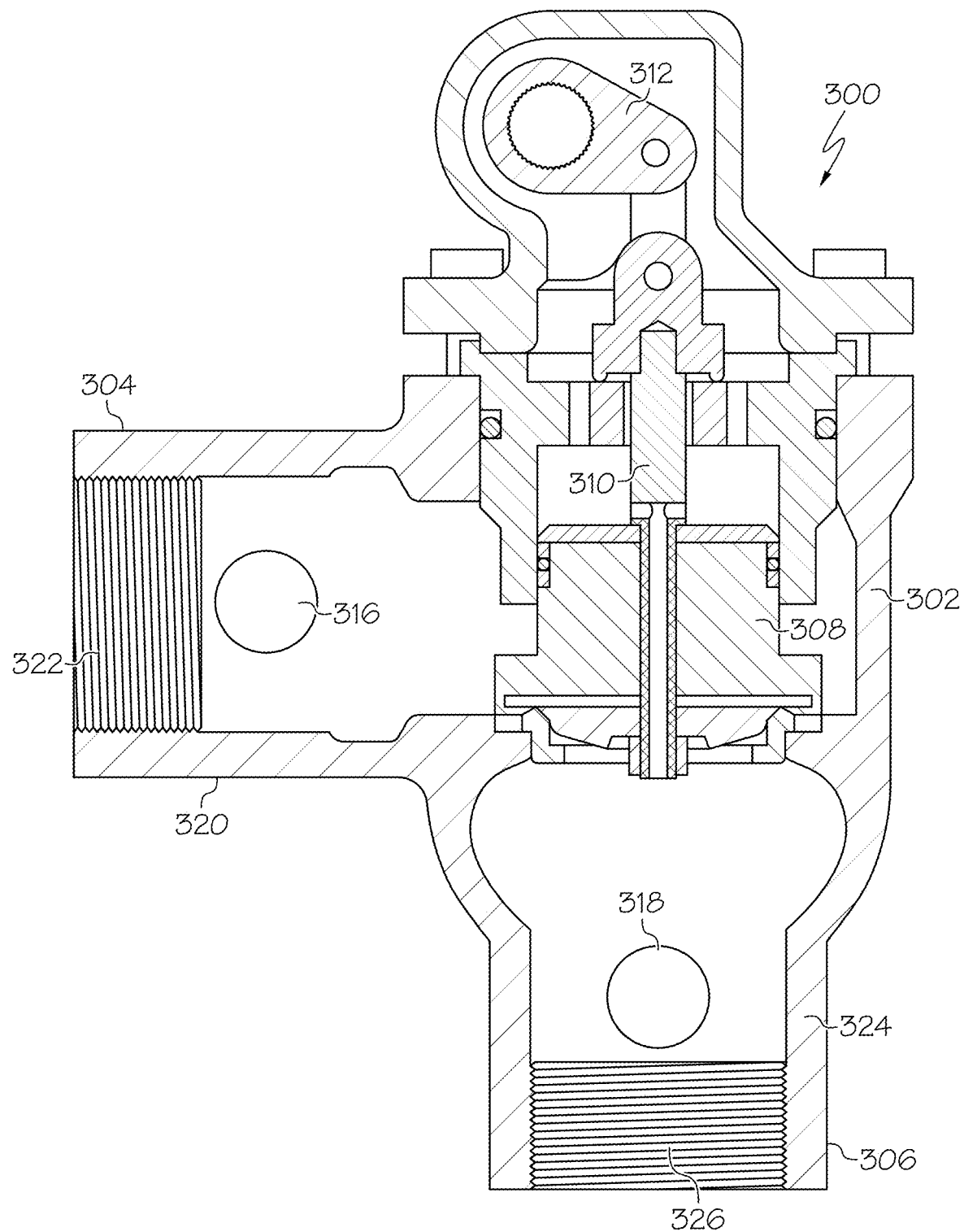
FIG. 19 is a vertical sectional view of a dump valve in accordance with another embodiment of the present invention.
Figure 20:
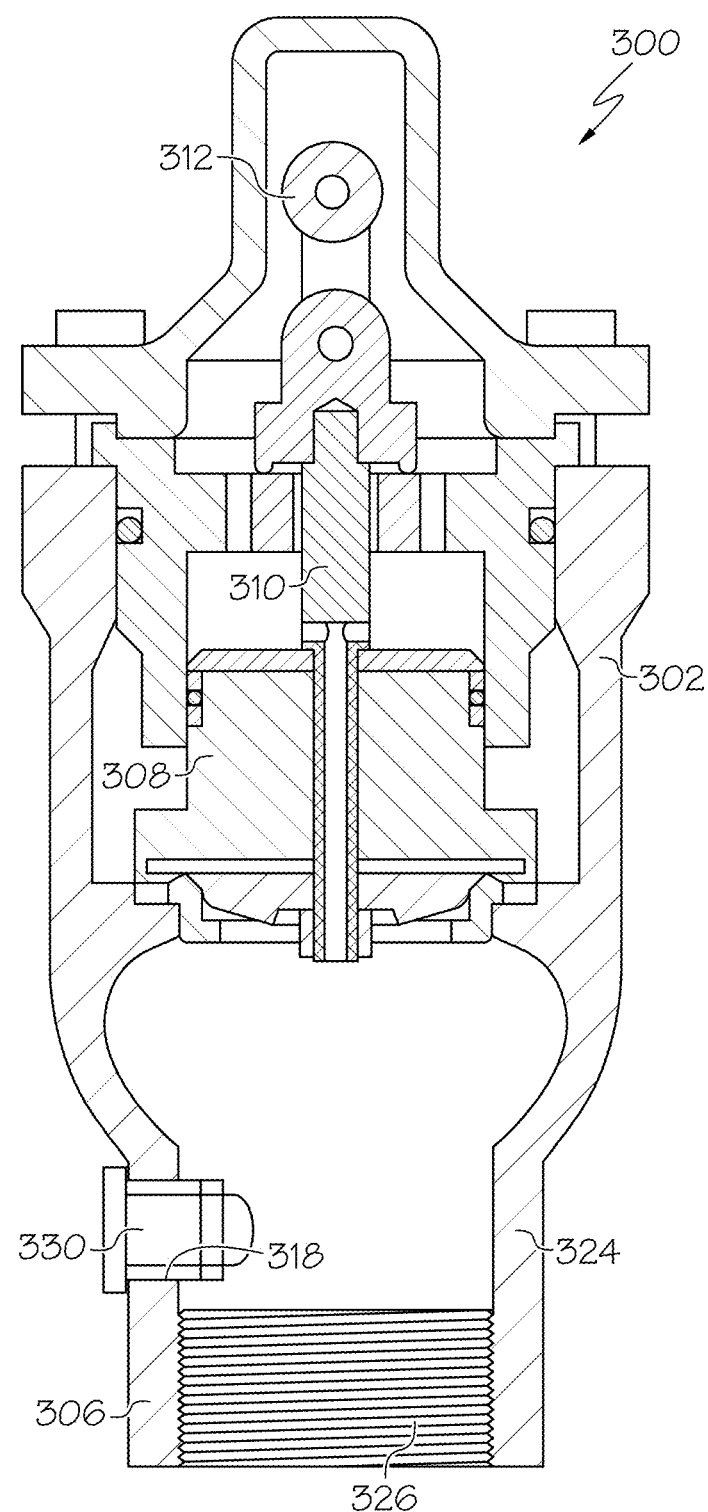
FIG. 20 is another vertical sectional view of the dump valve shown in FIG. 19 rotated ninety degrees from the view in FIG. 19.

With reference now to FIGS. 19 and 20, another advantageous feature of the improved dump valve will be described. The dump valve 300 may be similar to the dump valve 80 described previously. The valve 300 may comprise a valve body 302 defining an inlet 304 connectable to an input line (FIG. 1) and an outlet 306 connectable to an output line (FIG. 1). A valve mechanism, such as the valve member (piston) 308 and stem 310, is linked to a knuckle or hub 312, as previously described. As before, the type of valve mechanism may vary.

In accordance with the present invention, a pressure port 316 may be provided in the valve body 302 in fluid communication with the inlet 304 and an outlet pressure port 318 in the valve body in fluid communication with the outlet 306. In order to accommodate the ports 316 and 318, the valve body 302 may be provided with an extended cylindrical neck 320 continuous with the inlet between threads 322 of the inlet and main valve body and a similar neck 324 continuous with the outlet 306 between threads 326 of the outlet and main valve body. The ports 316 and 318 may include a manual bleed valve or nipple 330, as seen in FIG. 20. Alternately, the ports may be sized to receive a standard sized bleed nipple provided by the user. For example, the pressure ports may be threaded (threads not shown in the drawings) to receive 19.05 mm (three-quarter inch) or, alternately, a 25.40 mm (one inch) diameter bleed nipple. The bleed ports increase the safety of the dump valve 300 while eliminating the expense and inconvenience of the additional piping required in conventional systems.

The liquid level control system shown and described herein may be made and sold as a complete system comprising original components, as described previously. Alternately, the present invention contemplates the offering of a retrofit kit for modifying pre-existing systems that have D-shaped connections, that is, shafts (trunnion and/or dump valve) with D-shaped cross-sections that fit in hubs or knuckles with D-shaped bores to transmit torque.

Figure 21:
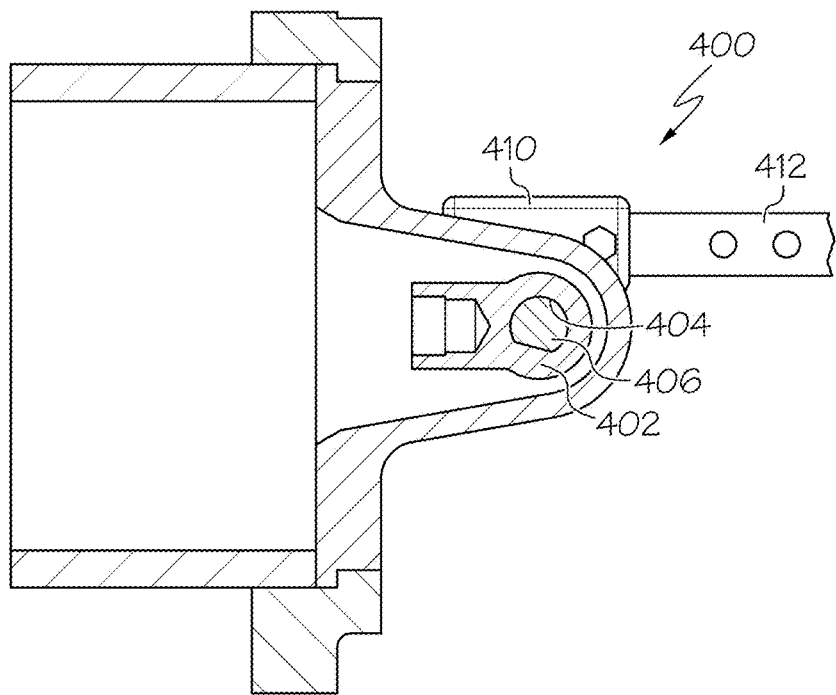
FIG. 21 is a vertical sectional view of a typical prior art trunnion assembly. The float arm is omitted to simplify the illustration.
Figure 22:
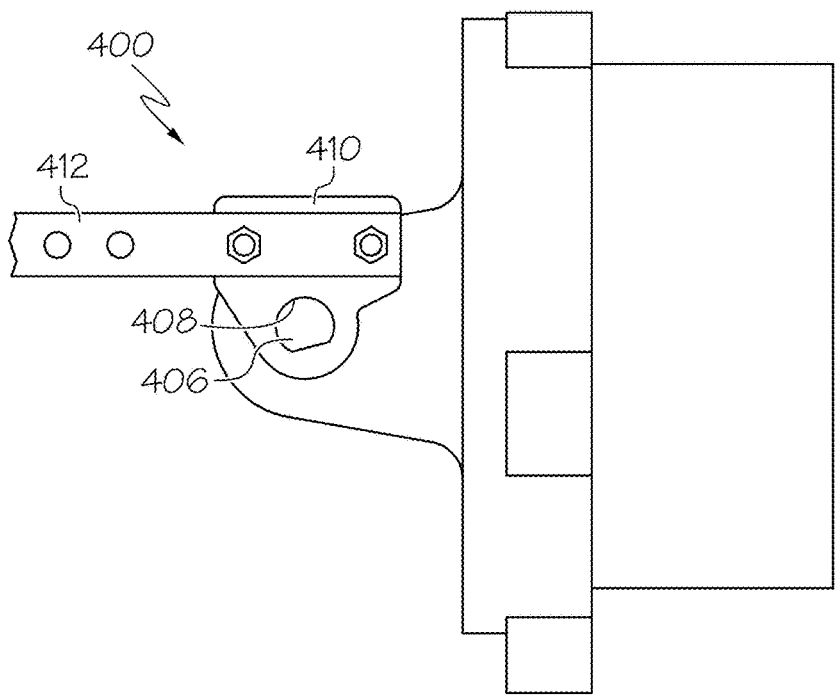
FIG. 22 is a back view of the trunnion assembly shown in FIG. 21. The end nut and washer have been removed from the exposed end of the trunnion shaft.

An exemplary prior art trunnion assembly 400 is illustrated in FIGS. 21 and 22. As seen in FIG. 21, the prior art float arm hub 402 has a D-shaped bore 404 that receives one end of a D-shaped shaft 406. In this typical prior art trunnion assembly 400, the other end of the D-shaped shaft 406 is received in a D-shape bore 408 in the lever hub 410 of the trunnion lever 412, as shown in FIG. 22.

Figure 23:
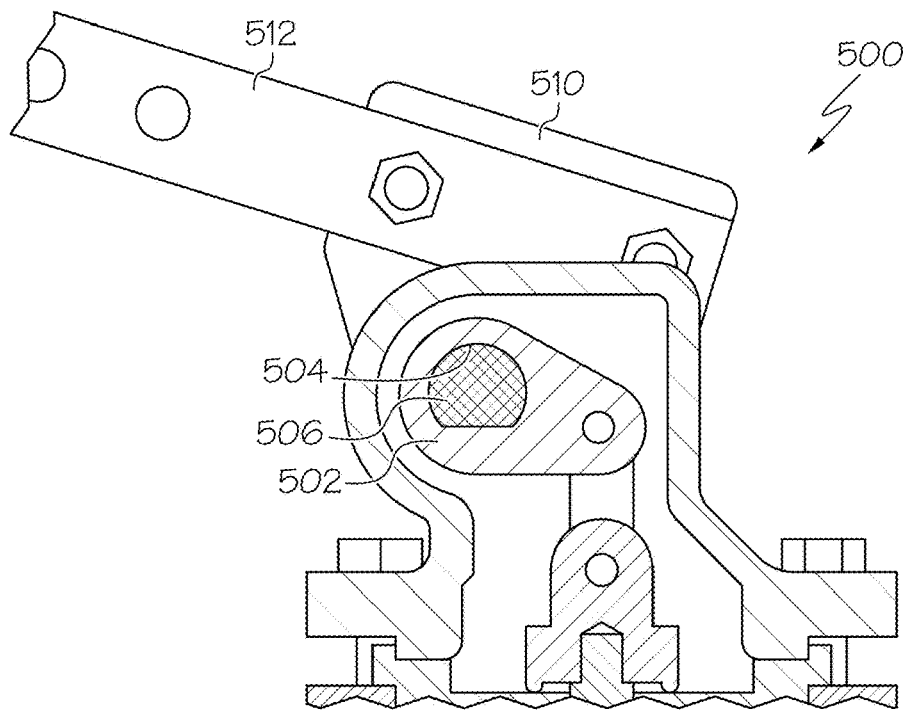
FIG. 23 is a fragmented, vertical sectional view of a typical prior art dump valve.
Figure 24:
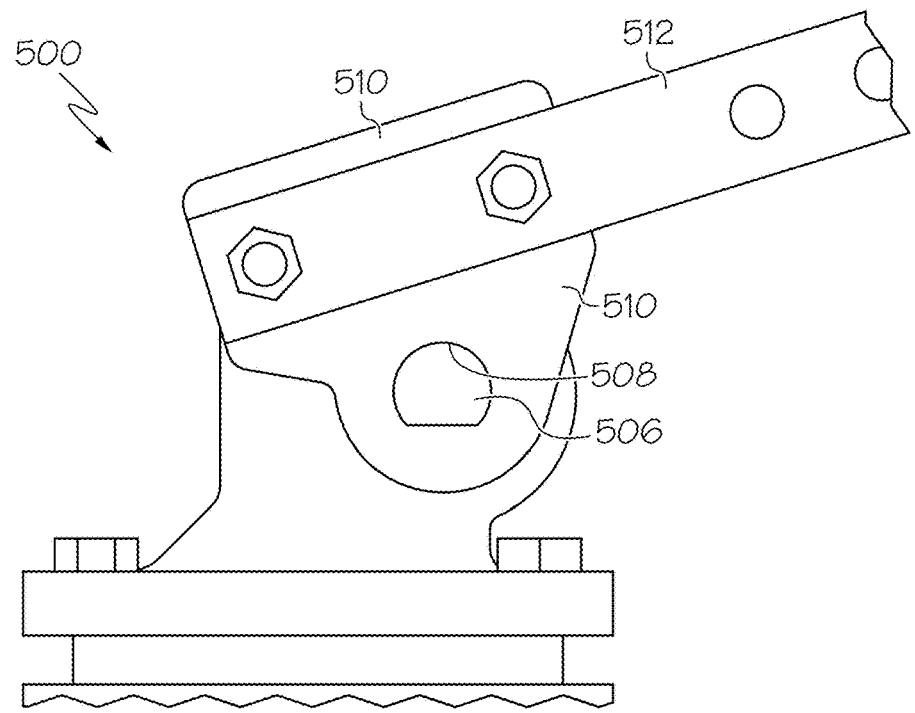
FIG. 24 is a back view of the dump valve shown in FIG. 23. The end nut and washer have been removed from the exposed end of the dump valve shaft.

An exemplary prior art dump valve assembly 500 is illustrated in FIGS. 23 and 24. As seen in FIG. 23, the prior art valve hub 502 has a D-shaped bore 504 that receives one end of a D-shaped shaft 506. In this typical prior art dump valve 500, the other end of the D-shaped shaft 506 is received in a D-shape bore 508 in the lever hub 510 of the dump valve lever 512, as shown in FIG. 24.

To that end, a retrofit kit may include a replacement float arm hub having an internally splined bore and configured to replace the float arm hub in an original liquid level control system. The kit also would include a replacement trunnion lever having an internally splined bore. Still further, the kit may include a replacement trunnion shaft having a first splined section non-rotatingly receivable in the splined bore of the replacement float arm hub so the replacement float arm hub is non-rotative relative to the replacement trunnion lever and a second splined section non-rotatingly receivable in the splined bore of the replacement trunnion lever so the replacement float arm hub is non-rotative relative to the replacement trunnion shaft.

The liquid level control system also may include a replacement dump valve lever having an internally splined bore, and a replacement dump valve hub operatively connectable to the original valve and having a splined bore. Also included is a replacement dump valve shaft, with a first splined section non-rotatingly receivable in the splined bore of the replacement dump valve lever so the replacement dump valve lever is non-rotative relative to the replacement dump valve shaft and a second splined section non-rotatingly receivable in the splined bore of the replacement dump valve lever so the replacement dump valve shaft is non-rotative relative to the replacement dump valve hub. The kit also may include a replacement linkage rod configured to interconnect the dump valve lever and the trunnion lever. The retrofit kit of this invention may include any or all of these components, depending on the structure of the pre-existing system.

For the purpose of this description, the words left, right, front, rear, top, bottom, inside and outside may be used to describe the various parts and directions of the invention as depicted in FIG. 1. These descriptive terms should not be considered as limiting the possible orientations of the invention or how it may be used. The terms are merely used to describe the various parts and directions so they may be readily understood and located in the drawings.

The embodiments shown and described above are exemplary. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the invention to the full extent indicated by the broad meaning of the terms in the attached claims. The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A mechanical dump valve assembly for use in a liquid level control system for controlling the level of liquid in a vessel, wherein the liquid level control system comprises a float supported on a float arm, the assembly comprising:
   a dump valve lever having a splined bore at one end thereof;
   a dump valve shaft having a first splined section and a second splined section, wherein the first splined section is matingly engaged with the splined bore of the dump valve lever so the dump valve lever is non-rotative relative to the dump valve shaft; and
   a dump valve comprising:
      a valve body with an inlet fluidly connectable to an input line from the vessel and an outlet fluidly connectable to an output line;
      a valve member positioned in the valve body and movable between an open position and a closed position to control passage of fluid from the inlet to the outlet;
      a valve actuator connected to the valve member to operate the valve member between the open position and the closed position; and
      a dump valve hub having a first end connected to the valve actuator and a splined bore wherein the second splined section of the dump valve shaft is matingly engaged with the splined bore of the dump valve hub so the dump valve shaft is non-rotative relative to the dump valve hub.

2. The mechanical dump valve assembly of claim 1 wherein the first and second splined sections of the dump valve shaft are discontinuous.

3. The mechanical dump valve assembly of claim 1 wherein the dump valve further comprises an inlet pressure port in the valve body in fluid communication with the inlet.

4. The mechanical dump valve assembly of claim 3 and wherein the valve body comprises an inlet neck continuous with the inlet and wherein the inlet pressure port is in the inlet neck.

5. The mechanical dump valve assembly of claim 4 wherein the dump valve further comprises an outlet pressure port in the valve body in fluid communication with the outlet.

6. The mechanical dump valve assembly of claim 5 and wherein the valve body comprises an outlet neck continuous with the outlet and wherein the outlet pressure port is in the outlet neck.

7. The mechanical dump valve assembly of claim 1 wherein the dump valve further comprises an outlet pressure port in the valve body in fluid communication with the outlet.

8. The mechanical dump valve assembly of claim 7 wherein the valve body comprises an outlet neck continuous with the outlet and wherein the outlet pressure port is in the outlet neck.

9. The mechanical dump valve assembly of claim 7 wherein the dump valve further comprises an inlet pressure port in the valve body in fluid communication with the inlet.

10. A liquid level control system for controlling the level of liquid in a vessel, the system comprising:
    a float;
    a float arm having a first end and a second end, the first end supporting the float and the second end having a splined bore;
    a trunnion assembly attachable to the vessel, the trunnion assembly comprising:
       a trunnion lever having a splined bore at one end; and
       a trunnion shaft having a first splined section and a second splined section, wherein the first splined section is matingly engaged with the splined bore of the float arm so the float arm is non-rotative relative to the trunnion shaft and the second splined section is matingly engaged with the splined bore of the trunnion lever so the trunnion shaft is non-rotative relative to the trunnion lever;
    a mechanical dump valve assembly, comprising:
       a dump valve lever having a splined bore at one end thereof;
       a dump valve shaft having a first splined section and a second splined section, wherein the first splined section is matingly engaged with the splined bore of the dump valve lever so the dump valve lever is non-rotative relative to the dump valve shaft; and
       a dump valve comprising:
          a valve body with an inlet fluidly connectable to an input line from the vessel and an outlet fluidly connectable to an output line;
          a valve member positioned in the valve body and movable between an open position and a closed position to control passage of fluid from the inlet to the outlet;
          a valve actuator connected to the valve member to operate the valve member between the open position and the closed position; and
          a dump valve hub having a first end connected to the valve actuator and a splined bore wherein the second splined section of the dump valve shaft is matingly engaged with the splined bore of the dump valve hub so the dump valve shaft is non-rotative relative to the dump valve hub; and
    a linkage rod operatively connecting the trunnion lever to the dump valve lever whereby trim motion of the float arm controls the operation of the dump valve.

11. The system of claim 10 wherein the dump valve further comprises an inlet pressure port in the valve body in fluid communication with the inlet.

12. The system of claim 11 wherein the dump valve further comprises an outlet pressure port in the valve body in fluid communication with the outlet.

13. The system of claim 10 wherein the dump valve further comprises an outlet pressure port in the valve body in fluid communication with the outlet.

14. A trunnion assembly for use with a mechanical dump valve in a liquid level control system for controlling the level of liquid in a vessel, wherein the liquid level control system comprises a float arm having first and second ends, and a float attachable to the first end of the float arm, the trunnion assembly comprising:
    a bonnet attachable to the vessel;
    a float arm hub having one end attachable to the second of the float arm and a splined bore;
    a trunnion lever having a splined bore at one end; and
    a trunnion shaft having a first splined section and a second splined section, the first splined section of the trunnion shaft matingly engaged with the splined bore of the trunnion lever so the trunnion shaft is non-rotative relative to the trunnion lever and the second splined section matingly engaged with the splined bore of the float arm hub so the float arm hub is non-rotative relative to the trunnion shaft.

15. The trunnion assembly of claim 14 wherein the first and second splined sections of the trunnion shaft are discontinuous.

16. A retrofit kit for a liquid level control system for controlling the level of liquid in a vessel, wherein the system comprises a float, a float arm, a trunnion assembly, a dump valve assembly, and a linkage rod, wherein the trunnion assembly comprises a float arm hub pivotally mounted in a bonnet, a trunnion lever having a D-shaped bore, a trunnion shaft having a first D-shaped section receivable in the D-shaped bore of the float arm hub and a second D-shaped section receivable in the D-shaped bore of the trunnion lever, whereby trim motion of the float is transmitted to the trunnion lever, and wherein the dump valve assembly comprises a lever having a D-shaped bore, a valve body fluidly coupled to the vessel, a valve member in the valve body configured to control the flow of fluid through the valve body, a pivotally mounted dump valve hub operatively connected to the valve member and having a D-shaped bore, a shaft having a first D-shaped section receivable in the D-shaped bore of the dump valve hub and a second D-shaped section receivable in the D-shaped bore of the dump valve lever, whereby motion of the dump valve lever is transmitted to the trunnion hub for operating the valve, the retrofit kit comprising:
- a replacement float arm hub having an internally splined bore and configured to replace the float arm hub in the liquid level control system;
- a replacement trunnion lever having a splined bore at one end thereof;
- a replacement trunnion shaft having a first splined section and a second splined section, the first splined section of the replacement trunnion shaft matingly engageable with the splined bore of the replacement trunnion lever so the replacement float arm hub is non-rotative relative to the replacement trunnion lever and the second splined section of the replacement trunnion shaft matingly engageable with the splined bore of the replacement float arm hub so the replacement float arm hub is non-rotative relative to the replacement trunnion shaft;
- a replacement dump valve lever having a splined bore at one end thereof;
- a replacement dump valve hub operatively connectable to the valve member and having a splined bore;
- a replacement dump valve shaft having a first splined section and a second splined section, the first splined section of the replacement dump valve shaft matingly engagable with the splined bore of the replacement dump valve lever so the replacement dump valve lever is non-rotative relative to the replacement dump valve shaft and the second splined section of the replacement dump valve shaft matingly engageable with the splined bore of the replacement dump valve hub so the replacement dump valve shaft is non-rotative relative to the replacement dump valve hub, whereby motion of the replacement dump valve lever is transmitted to the valve member for operating the valve.

17. The retrofit kit of claim 16 further comprising a replacement linkage rod configured to interconnect the replacement dump valve lever and the replacement trunnion lever.

* * * * *